(12) United States Patent
Scott et al.

(10) Patent No.: US 6,338,094 B1
(45) Date of Patent: Jan. 8, 2002

(54) METHOD, DEVICE AND SYSTEM FOR PLAYING A VIDEO FILE IN RESPONSE TO SELECTING A WEB PAGE LINK

(75) Inventors: Samuel Thomas Scott, Los Gatos; Timo Bruck, Mountain View; Lena D. Sack, San Francisco; Garth A. Lewis, Sunnyvale; Kristen V. Holbrook Donato, Burlingame, all of CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/457,882

(22) Filed: Dec. 9, 1999

Related U.S. Application Data (63) Continuation-in-part of application No. 09/149,405, filed on Sep. 8, 1998, which is a continuation-in-part of application No. 09/149,407, filed on Sep. 8, 1998.

(51) Int. Cl.[7] .......................... G06F 15/16; G06F 15/177
(52) U.S. Cl. .......................... 709/245; 725/52; 725/109
(58) Field of Search .................................. 709/250, 234, 709/245; 345/327, 335; 725/2, 20, 41, 42, 43, 48, 51, 52, 109, 112

(56) References Cited

U.S. PATENT DOCUMENTS

| 5,305,195 A | | 4/1994 | Murphy | |
|---|---|---|---|---|
| 5,572,643 A | | 11/1996 | Judson | |
| 5,659,367 A | * | 8/1997 | Yuen | ........................ 348/465 |
| 5,675,510 A | | 10/1997 | Coffey et al. | ............ 364/514 A |
| 5,737,619 A | | 4/1998 | Judston | ...................... 395/761 |
| 5,796,424 A | * | 8/1998 | Ely et al. | ...................... 348/15 |
| 5,796,952 A | | 8/1998 | Davis et al. | .......... 395/200.54 |
| 5,818,439 A | * | 10/1998 | Nagasaka et al. | .......... 725/100 |
| 5,828,837 A | | 10/1998 | Eikeland | ................ 395/200.32 |
| 5,848,396 A | | 12/1998 | Gerace | ........................ 705/10 |

(List continued on next page.)

FOREIGN PATENT DOCUMENTS

| EP | 0 749 081 | 12/1996 |
|---|---|---|
| WO | WO 93/19427 | 9/1993 |
| WO | WO 96/30864 | 10/1996 |

OTHER PUBLICATIONS

FGDC, "Details of instructions for preparing a Data description using the NOAA FGDC Meta data standard template", Jun. 8, 1994, U.S. Geological Survey National Center, 2 pages.*

Berners et al., "Universal Resource Identifiers in WWW" (RFC 1630), 6/94, W3.org, 25 pages.*

(List continued on next page.)

*Primary Examiner*—Mark H. Rinehart
*Assistant Examiner*—Bunjob Jaroenchonwanit
(74) *Attorney, Agent, or Firm*—Workman, Nydegger & Seeley (57) ABSTRACT

A method, device and system for displaying at a user interface device a richly-detailed video or TV file upon selecting a link to a web page corresponding to the file. After the video or TV file has played, the web page is displayed, inserting a television or video experience into a web surfing experience. The video or TV file is downloaded to the user interface device during an otherwise idle time when bandwidth for downloading is available. Clicking the link to the web page may send a specialized URI from the device to a service center that signals the device to play the video or TV file and retrieve the web page, allowing the service center to manage display of the video or TV files. This has particular utility for links that are banner advertisements and provide video or TV advertisements upon clicking the banner to access a web page.

38 Claims, 5 Drawing Sheets

U.S. PATENT DOCUMENTS

| | | | | |
|---|---|---|---|---|
| 5,884,028 | A | * | 3/1999 | Kindell et al. ............... 709/234 |
| 5,898,833 | A | * | 4/1999 | Kidder ........................ 709/234 |
| 5,905,492 | A | | 5/1999 | Straub et al. .................. 345/33 |
| 5,913,040 | A | | 6/1999 | Rakavy et al. .......... 395/200.62 |
| 5,929,850 | A | * | 7/1999 | Broadwin et al. ........... 345/327 |
| 5,933,811 | A | * | 8/1999 | Angles et al. ................. 705/14 |
| 5,937,037 | A | | 8/1999 | Kamel et al. ............ 379/88.19 |
| 5,948,061 | A | | 9/1999 | Merriman et al. .......... 709/219 |
| 5,960,429 | A | | 9/1999 | Peercy et al. .................... 707/5 |
| 5,974,398 | A | | 10/1999 | Hanson et al. ................. 705/14 |
| 5,978,381 | A | | 11/1999 | Perlman et al. ............. 370/432 |
| 5,991,735 | A | | 11/1999 | Gerace ......................... 705/10 |
| 6,009,410 | A | | 12/1999 | LeMole et al. ............... 705/14 |
| 6,009,452 | A | | 12/1999 | Horvitz ...................... 709/102 |
| 6,028,600 | A | | 2/2000 | Rosin et al. ................. 345/327 |
| 6,034,652 | A | | 3/2000 | Freiberger et al. ............. 345/2 |
| 6,049,831 | A | * | 4/2000 | Gardell et al. .............. 709/236 |
| 6,061,738 | A | * | 5/2000 | Osaka et al. ................. 709/245 |
| 6,018,619 | A | | 6/2000 | Browning ................... 382/313 |
| 6,073,167 | A | | 6/2000 | Poulton et al. ............. 709/206 |
| 6,076,093 | A | * | 6/2000 | Pickering .................... 707/104 |
| 6,081,629 | A | | 6/2000 | Browning ................... 382/313 |
| 6,098,069 | A | | 8/2000 | Yamaguchi ................. 707/102 |
| 6,101,549 | A | | 8/2000 | Baugher et al. ............ 709/238 |
| 6,119,098 | A | | 9/2000 | Guyot et al. .................. 705/14 |
| 5,947,398 | A | | 10/2000 | Yeh .............................. 705/14 |
| 6,133,912 | A | | 10/2000 | Montero ..................... 345/327 |
| 6,134,584 | A | | 10/2000 | Chang et al. ............... 709/219 |
| 6,144,944 | A | | 11/2000 | Kurtzman, II et al. ........ 705/14 |
| 6,144,973 | A | | 11/2000 | Fujii et al. ................... 707/501 |
| 6,154,771 | A | * | 11/2000 | Rangan et al. .............. 709/217 |
| 6,167,453 | A | * | 12/2000 | Becker et al. .............. 709/245 |
| 6,173,316 | B1 | * | 1/2001 | De Boor et al. ............ 709/218 |
| 6,175,862 | B1 | * | 1/2001 | Chen et al. .................. 709/218 |
| 6,184,878 | B1 | * | 2/2001 | Alonso et al. .............. 725/109 |
| 6,185,586 | B1 | | 2/2001 | Judson ........................ 707/513 |
| 6,219,042 | B1 | * | 4/2001 | Anderson et al. ........... 345/716 |
| 6,230,324 | B1 | * | 5/2001 | Tomita et al. ................. 725/51 |
| 6,240,456 | B1 | * | 5/2001 | Teng et al. .................. 709/230 |
| 6,260,066 | B1 | * | 7/2001 | Bittinger et al. ............ 709/224 |
| 2001/0001160 | | * | 5/2001 | Shoff et al. .................... 725/51 |

OTHER PUBLICATIONS

Jupiter, "Content's Manifest Destiny," Dec. 1997, p. 2.

Microsoft unveils advertising, "Electronic Market Place Report," Aug. 1995, v9, n15, p. 1.

Taylor, Cathy "Going Beyond the Banner," Jul. 1996, pp. 36–41.

"Monitoring Corporate Info. with First Floor Products," First Floor Inc. 1996.

Fortanet et al., "Netvertising: Content–Based Subgeneric Variations in a Digital Genre," IEEE, 1998, pp. 10.

Monticino, "Web–analysis: Stripping away the hype," Dec. 1998, v31, n12, pp. 3.

Mcarthur, "World Wide Web & HTML," Dr. Dobb's Journal, Dec. 1994.

* cited by examiner

FIG. 4 wtv-content:/ct2vid.tmpl?video-url=file:///disk/Browser/ad.mpg
  110        112              115

&follow-url=http://microsoft.com
         118                                    ← 105

METHOD, DEVICE AND SYSTEM FOR PLAYING A VIDEO FILE IN RESPONSE TO SELECTING A WEB PAGE LINK

CROSS-REFERENCE TO RELATED APPLICATIONS

This application is a continuation-in-part of U.S. patent application Ser. No. 09/149,405 and a continuation-in-part of U.S. patent application Ser. No. 09/149,407, both of which were filed on Sep. 8, 1998.

BACKGROUND

Figure 8:
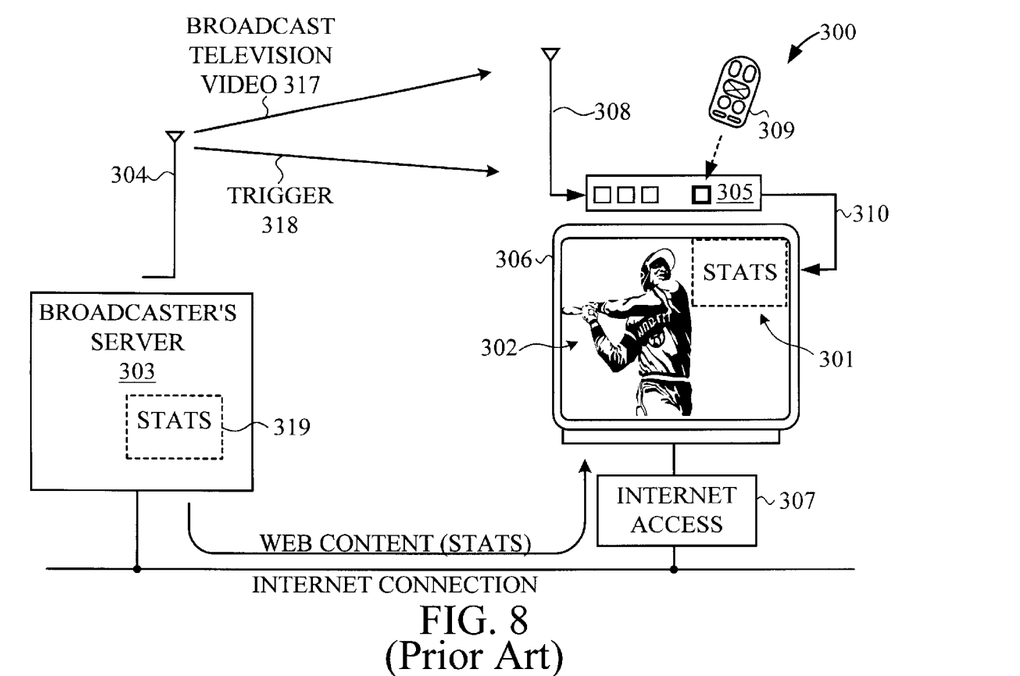
FIG. 8 (Prior Art) is a simple plan view diagram of an interactive television system.

FIG. 8 (Prior Art) is a diagram of an interactive television system 300 that enhances a television viewing experience by integrating television programming with content from the Internet. The broadcast of a baseball game can, for example, be enhanced by retrieving relevant information (for example, a batter's batting statistics 301) from the Internet and displaying that information at an appropriate point in the baseball game (for example, when the batter 302 is batting).

System 300 includes a server 303 maintained by the broadcaster, a broadcasting antenna 304, a transceiver unit 305, a television set 306, and an Internet access point 307. Transceiver unit 305, which may be a set-top box, includes a receiving antenna 308 and a remote control unit 309. A viewer uses remote control unit 309 to control the transceiver unit and/or to interact with interactive television content via the transceiver unit. A video link 310 couples transceiver unit 305 to television set 306 so that the transceiver unit can use the television set as a display device.

Figure 9:
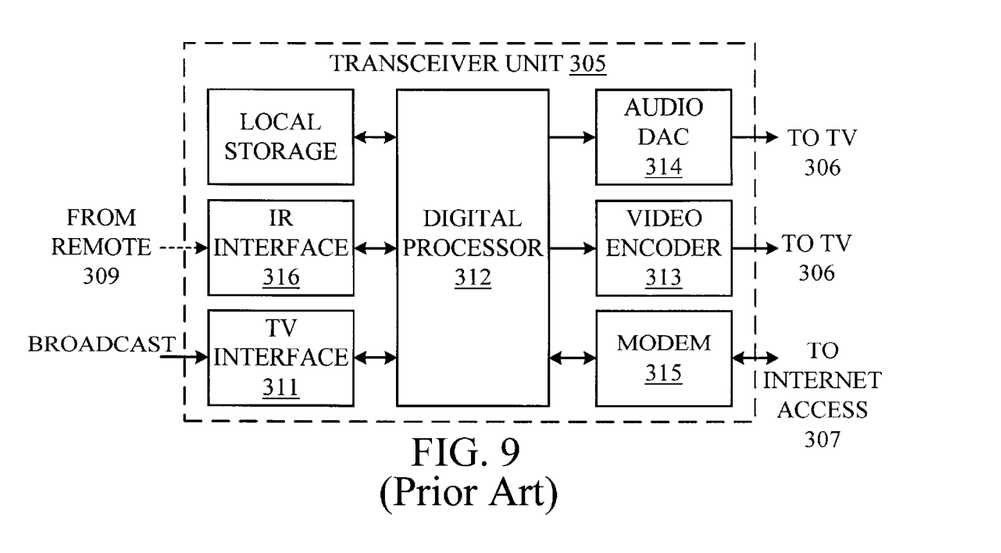
FIG. 9 (Prior Art) is a block diagram of a transceiver unit of the system of FIG. 8.

FIG. 9 (Prior Art) is a block diagram of transceiver unit 305. TV interface circuitry 311 of the transceiver unit 305 includes a tuner that is tuned to receive broadcast television video and to remove a television carrier signal. TV interface circuitry 311 digitizes the video signal after the carrier signal has been removed. Software executed by a digital processor 312 receives the digitized signal from TV interface 311 and decodes and checks the digitized signal for errors. Transceiver unit 305 drives the television set 306 via video encoder 313 and audio digital-to-analog converter 314. Digital processor 312 realizes a type of web browser that can access the Internet via a modem 315. Transceiver unit 305 includes an infrared interface 316 for receiving infrared transmissions from remote control unit 309. Local storage provides memory for processor 312, and may house a web browsing program.

Television video 317 is broadcast over the airwaves from broadcasting antenna 304 to receiving antenna 308 of transceiver unit 305. At an appropriate time in the baseball game when the broadcaster wishes batter statistics 301 to be displayed (for example, when batter 302 appears on the television screen), the broadcaster broadcasts a trigger 318 along with the television video 317. Trigger 318 contains a Uniform Resource Locator (URL) that identifies an information resource 319 on the broadcaster's server 303. In this case, information resource 319 is a web page containing the batter's statistics.

Transceiver unit 305 receives trigger 318, accesses the Internet via Internet access point 307, uses the URL from the trigger to retrieve the web page of batter statistics from server 303, and then displays the batter statistics 301. In this way, broadcasters use triggers to have their viewers' transceiver units retrieve information from the Internet and display that information in concert with their programming. Transceiver unit 305 and television 306 together form a user interface device that is a client of the server 303 while connected to the Internet, similar to personal computer that is connected to the Internet by an Internet service provider (ISP).

In general, connection of a user interface device to the Internet may be made by a variety of communication channels, including twisted pair telephone lines, coaxial cable, and wireless signal communication via local transceivers or orbiting satellites. Most user interface device Internet connections are made by relatively low-bandwidth communication channels, mainly twisted pair telephone lines, due to the existing infrastructure of such telephone lines and the cost of implementing high-bandwidth infrastructure. This constrains the type of information that may be presented to users via the Internet connection, because television transmissions generally require greater bandwidth than twisted pair telephone wires can provide. U.S. Pat. No. 5,978,381 to Perlman et al., which is incorporated by reference herein, provides means for distributing high-bandwidth information to users via low-bandwidth communication channels by distributing the content at times when the users are not using the Internet connection.

Connecting to the Internet via an ISP over a low-bandwidth communication channel typically involves a delay of perhaps thirty seconds. During this time, general video information stored in a user interface device may be displayed, as disclosed in U.S. patent application Ser. No. 09/149,405 to Bruck et al., incorporated by reference herein. This video information is downloaded via the Internet, for example overnight, so that it may be displayed when the user interface device is being powered-up at a later time. The general video information may also be displayed on the user interface device during a reconnection to the Internet after a long period of disconnection from the Internet.

Once connected to the Internet another delay commonly occurs when the user attempts to access a web page, particularly as information from the web page is transferred to the user interface device. Depending upon the protocol employed, further delay may be encountered as the temporary connection between the user interface device and web page is established. It is common during these delays for an hourglass or similar symbol that signifies waiting to be displayed to the user. Also, a simple graphic associated with the link or web page being accessed may be displayed during the delay in loading the web page, as disclosed in U.S. patent application Ser. No. 09/149,407 to Bruck et al., incorporated herein by reference. Such a graphic may be static or may display simple motion. The information required to display the graphic is downloaded prior to display of the graphic, the graphic information download occurring during idle time after a first web page has finished downloading and before another web page has been requested.

Television and video differ from web graphics in the apparent richness of the television or video experience as compared with the relative simplicity of animated web graphics. Other differences may be categorized in terms of formats or standards. Television standards include National TV Standards Committee (NTSC), Phase Alternating Line (PAL), Systeme En Couleur Avec Memoire (SECAM), and Advanced Television Systems Committee (ATSC). Video, which may involve compression of television information for facilitating transmission and storage, has standards including Moving Pictures Experts Group (MPEG) and variants MPEG 1–4 and M-JPEG.

Web pages and graphics, on the other hand, accord to formats or standards such as American Standard Code for Information Interchange (ASCII) for text, Joint Photographic Experts Group (JPEG) for pictures and Macromedia Flash for vector graphics. Web pages and graphics are presented via hypertext markup language (HTML) or extensible markup language (XML) documents that are interpreted by web browser programs executed by a processor in the user interface device to create the desired display.

A general difference between web graphics and television or video files is that web graphics are run as programs that manipulate the display in an organized manner defined by the programs, whereas television and video files are presented in a typically large series of display frames, each of which may include information about all the pixels forming the frame. As a result, presentation of a television file or video file requires many times the amount of information required for a web page presenting web graphics of a similar duration. This difference is usually apparent to the viewer, as web surfing typically does not offer the rich visual and audio presentations available via television or video. On the other hand, television and video do not offer the variety of topics available to a user by navigating millions of web pages available on the World Wide Web.

SUMMARY

An advantage of the present invention is that richly detailed video and audio may be displayed by a user interface device virtually immediately upon clicking a link for accessing a web page, the video and audio corresponding in content to the link that was clicked. The realistic experience offered by this lifelike video and audio may be particularly beneficial for advertising associated with the link and web page being accessed. In fact, this content may be so entertaining that it lasts beyond the time needed to mask the delay in accessing and loading the web page.

In order to provide to the user the large amount of information needed for playing realistic audio and video files, that information may be downloaded to the user interface device prior to the user clicking on the link. The information may be downloaded during a period when the user is not interacting with the Internet, such as during the night, and may be stored on an information storage unit of the device. When the user then clicks on the link, the web page associated with the link may be accessed and begin loading. During this interstitial period, the previously downloaded information associated with the link is played as a video file, inserting a video experience into a web experience.

A signal generated by the click on the link at the user interface device may be sent to a service center that both signals the user interface device to play the previously downloaded video file, and prefetches the requested web page from a remote server. The initial signal may be in the form of an uniform resource identifier (URI) that itself contains plural URIs, one of which is directed to a web page provided by a remote server and another of which is directed to a file on the user interface device containing the previously downloaded information. The service center may thus manage the advertisement or other video file that is played in response to actuating the link, including anticipating user preferences and prioritizing information to be played.

In one embodiment, a presently disclosed "Click-To-Video" advertisement of the present invention allows users to select an advertiser's banner ad and then to view a fullscreen, full-motion video-TV commercial for the advertiser's product before arriving at the advertiser's Web site. This feature benefits advertisers by allowing them to seamlessly integrate their online and television campaigns, and benefits audiences by providing them with entertainment while they access information they find relevant.

DETAILED DESCRIPTION OF THE PREFERRED EMBODIMENT

Figure 1:
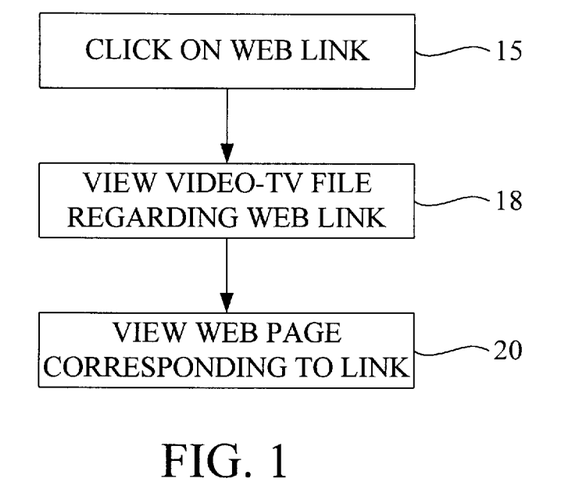
FIG. 1 illustrates a series of user experiences provided in accordance with the present invention.

FIG. 1 illustrates a series of user experiences provided in accordance with the present invention. An operator of a user interface device such as a network computer or a television having a set-top box connected to the Internet clicks 15 on a web link, which may for instance be a banner advertisement, and is able to view 18 a video-TV file playing on their computer or television screen. The video video-TV file provides lifelike motion and sound relating to the link, and begins virtually immediately after the click 15. Upon completion of the video, the user can view 20 the web page that was requested by the click 15. A television experience rich in color, motion and sound is thus provided to the web surfer directly upon request, without the delay that commonly follows clicking a link to request even a simple web page. After the video-TV file has played, the requested web page may be viewed.

To differentiate between television or video and web graphics, the term video-TV is used to signify a display in which a series of multiple display frames are presented corresponding to a sequence of pictures that were recorded, the display frames presented at a refresh rate more frequent than that detectable by human vision. Each of the video-TV display frames may include information about all the pixels displayed in the frame, and changes between consecutive display frames are not created by a computer program but rather are the result of changes recorded in the sequence of pictures. In contrast, as noted above, web graphics are interpreted by web browser programs that manipulate the display in an organized manner defined by the graphics and programs.

Figure 2:
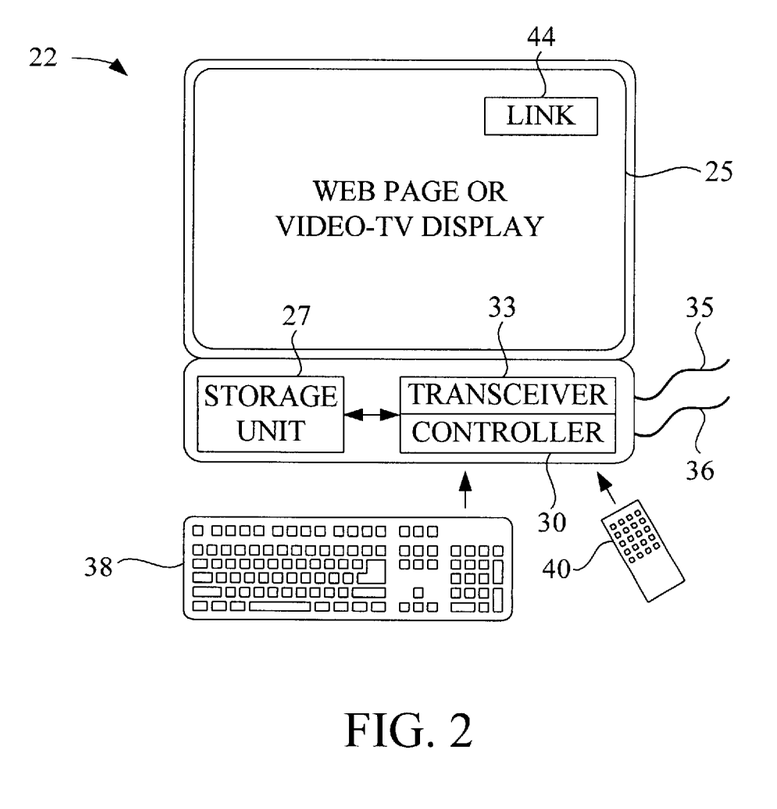
FIG. 2 is a simple plan view diagram of a user interface device associated with the experiences of FIG. 1.

FIG. 2 shows a user interface device 22 that provides the user experience of FIG. 1. The user interface device 22 includes a display 25 such as a cathode ray tube (CRT), flat panel display, or touch screen display. The device 22 also includes a mass storage unit 27 such as a disk drive in communication with a controller 30 which manages a transceiver 33. Controller 30 is preferably a digital processor that includes semiconductor memory. A modem of transceiver 33 communicates with the outside world such as the Internet via a wire 35, while an optional second wire 36 provides broadcast signals such as television broadcasts at an optional television interface.

Wire 35 may be a twisted pair of telephone lines, coaxial cable or fiber-optic cable, and may be a link to an antennae for wireless communication. In one embodiment, both broadcast signals such as television broadcasts and an Internet connection is provided by single wire 35. In another embodiment, both broadcast signals such as television broadcasts and an Internet connection may be provided by wire 35 connected to a satellite transceiver such as a satellite dish, while wire 36 provides another communication link. The transceiver 33 also can receive signals from an optional keyboard 38 and a pointing apparatus 40 such as a mouse or remote control via a wire or the infrared interface, and provides signals via a video encoder/decoder and digital-analog converter for presenting information on the display 25.

In one embodiment, the device 22 is a television connected with a set-top box such as a Web TV® Plus Internet terminal. The transceiver 33 in this case has TV interface circuitry including a tuner that is tuned to receive the broadcast television video and to remove a television carrier signal. After the carrier signal is removed, TV interface circuitry digitizes the resulting video signal. In addition to the television interface, transceiver 33 preferably includes an infrared interface, a digital-analog converter, a video encoder/decoder and a modem. Software executed by the controller 30 receives the digitized signal from TV interface and decodes and checks the digitized signal for errors. Transceiver 33 drives the display 25, which in this embodiment is a television set, via video encoder and audio digital-to-analog converter. The controller 30 realizes a type of web browser that can access the Internet via a modem contained in the transceiver.

The display 25 provides a graphical user interface (GUI) that is showing a web page or video including a superimposed link 44, the link providing a convenient means to request the web page. The link 44 may be depicted on the display as an icon, a graphic display, an advertisement or text, for example. Positioning a cursor on the link 44 and clicking with the pointing device, or touching the link for the case of a touch screen display, causes a signal to be generated at the device that includes a request for information from the web page. The link 44 which for which video-TV information has been downloaded may optionally be indicated on the display with a watermark, wavy underline or other indication that a video-TV file is available upon clicking the link. In one embodiment, the previously downloaded video-TV file may be played if a user types in a web address instead of clicking on a link.

Figure 3:
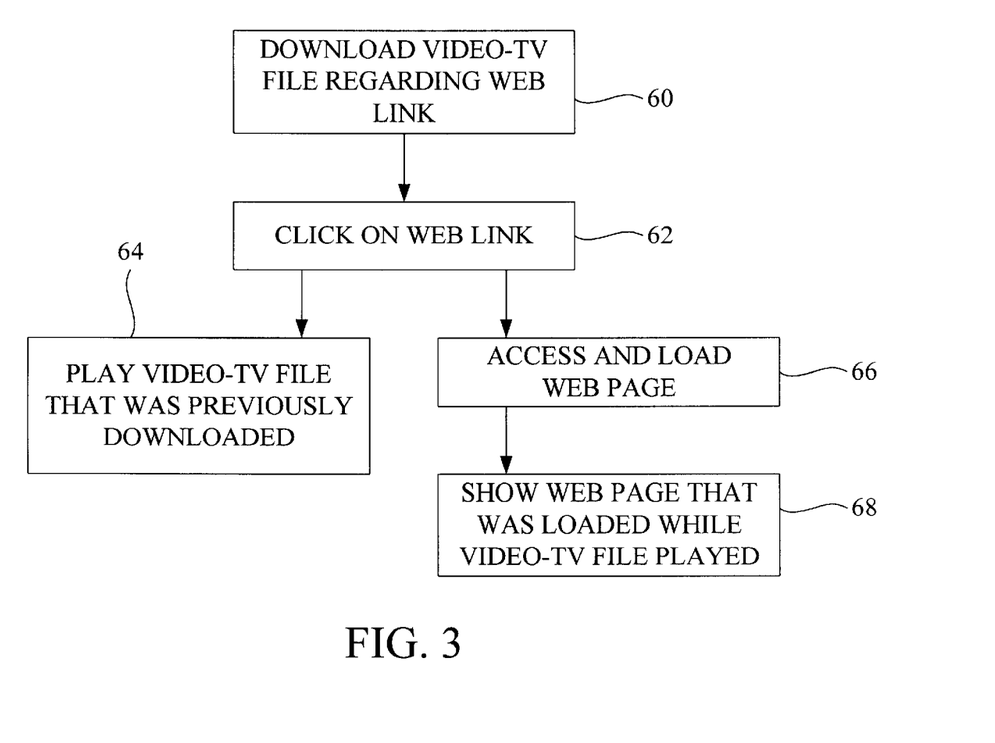
FIG. 3 shows a series of steps performed at the user interface device to provide the user experience of FIG. 1.

FIG. 3 shows a series of steps performed at the user interface device 22 of FIG. 2 that may provide the user experience of FIG. 1. First, a video-TV file is downloaded 60 to the device via wire 35 or 36, and stored on the information storage unit 27. This downloading preferably occurs during a time when the user is not using the device, such as overnight, since a large amount of information is downloaded to enable the video-TV display, requiring sufficient bandwidth and time. At a later time such as the following day, the user may be viewing television or a web page and clicks 62 on the link 44, desiring to receive more information relating to the link. A signal is sent by the click on the link may initiate both playing the video-TV file and accessing the web page. Directly after the click 62, the previously downloaded video-TV file is played 64 on the display 25. At the same time, the web page corresponding to the link may be accessed, and the web page content is can then be loaded 66 into a memory of the device. When the video-TV file is finished playing, the web page is shown on the display 25.

Figure 4:
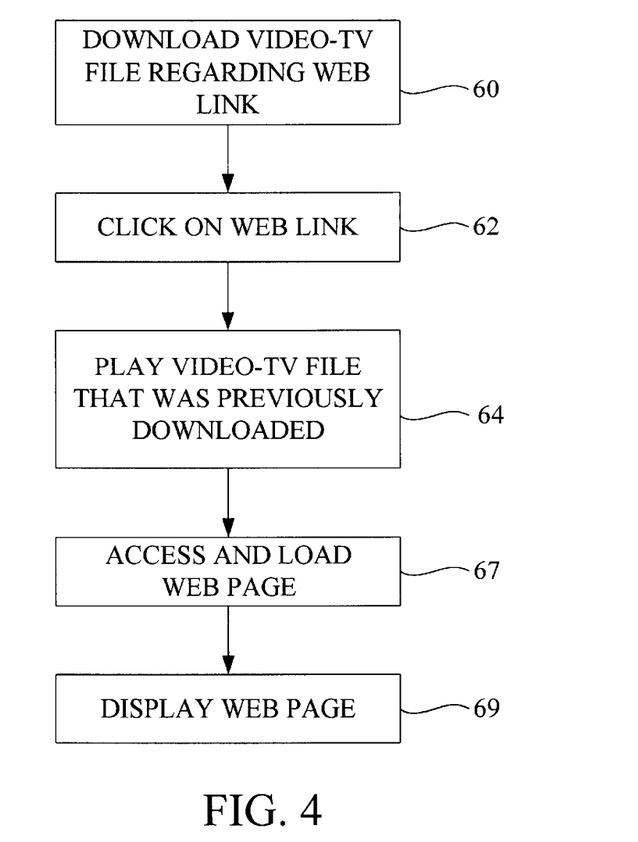
FIG. 4 shows an alternative series of steps performed at the user interface device to provide the user experience of FIG. 1.

FIG. 4 shows another series of steps performed at the user interface device 22 of FIG. 2 that may provide the user experience of FIG. 1. As previously described, a video-TV file is first downloaded 60 to the device and stored on the information storage unit. The viewer then clicks 62 on a web link, in response to which the video-TV file that was previously downloaded is played 64. When the video-TV file is done playing, the user interface device accesses and loads 67 the web page, which is then displayed 69 on the device.

For the situation in which a high-bandwidth Internet connection is provided to device 22, video-TV content corresponding to a web link being displayed may be downloaded to the mass storage unit 27 during the time that the link is being displayed and the bandwidth is available for receiving information. In this situation the video-TV content may then be displayed when the user clicks on the link. After the video-TV content corresponding to the link has been displayed, the web page corresponding to the link is displayed. The video-TV content need not be completely downloaded to mass storage unit 27 before display of that content begins.

Figure 5:
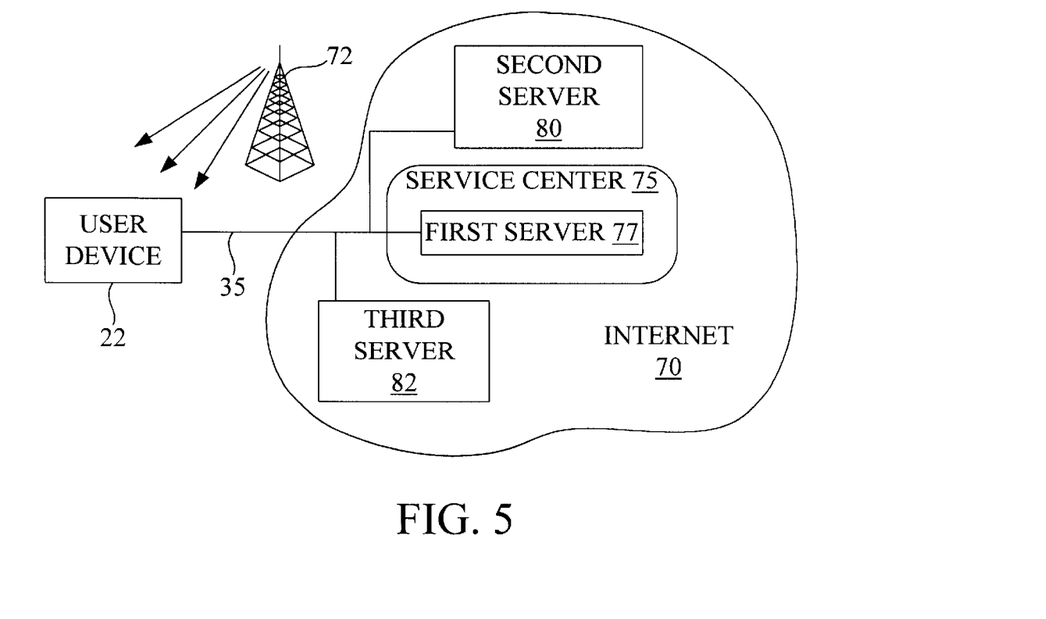
FIG. 5 is a simple plan view diagram of a system for carrying out the present invention, including the device of FIG. 2.

FIG. 5 shows a system for carrying out the video-enhanced web surfing illustrated in the previous three figures. The system includes the device 22 connected by wire 35 to a network such as the Internet 70. Although not shown in this figure for clarity, the device 22 becomes a part of the Internet once connected. A television transmitter 72 may broadcast television signals that are received by the transceiver for display on the device 22, although the optional broadcast signals may alternatively be broadcast by satellite or provided by local cable or fiber optic connections as is known in the art. A service center 75 including a first server 77 interacts with device 22 and a plurality of similar devices, not shown. A remote second server 80 and third server 82 are connected via the Internet to the device 22 and the first server 77. For clarity, the simplified diagram of FIG. 4 omits myriad hubs, switches, routers and repeaters that may exist between servers 77, 80, 82 and device 22.

The service center 75 may be part of an Internet service provider (ISP) that provides various services for clients such as user interface device 22, and may be identified by a uniform resource locator (URL) specific to that ISP. In a preferred embodiment, the ISP is WebTV® service, which is associated with a URL prefix of "wtv", so that Internet messages from device 22 having that prefix are routed to and read by servers on the WebTV® network, such as first server 77. The service center 75 provides the video-TV file that is downloaded to and stored on device 22, the video having a topic associated with the link.

The video-TV file may be compressed at the service center and may be digitized before being sent from the service center 75 to the device 22. One method for compression of television to video is called VideoFlash to MPEG, which may provide a compression ratio of about 1000/1. The video file that is sent to the device is preferably in accordance with an MPEG standard and may be stored in the storage unit 27 of device 22 as an MPEG or other video format file. Plural video files may be downloaded from the service center 75 to the device 22, each of the files corresponding to a different web page and link. After the video file has been downloaded from the service center 75 to device 22, the device may send an acknowledgement to the service center indicating completion of downloading.

Figure 6:
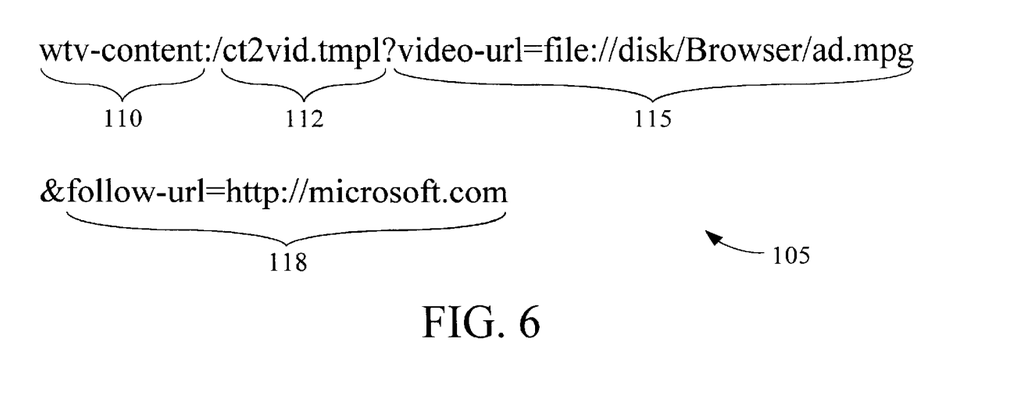
FIG. 6 is a specialized message including plural uniform resource identifiers of the present invention.
Figure 7:
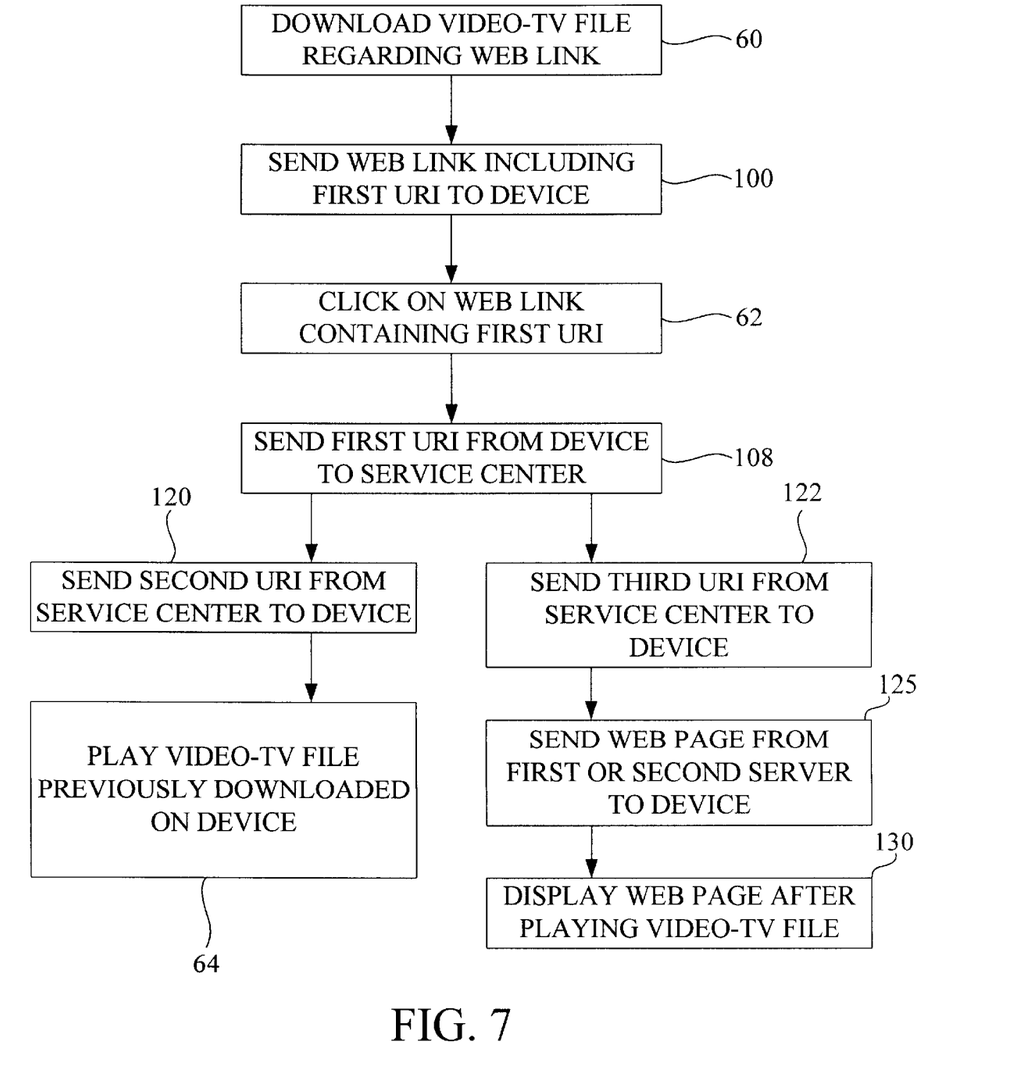
FIG. 7 shows a series of steps performed in the system of FIG. 5 to provide the user experience of FIG. 1.

Referring additionally to FIG. 6 and FIG. 7, after downloading 60 the video file regarding the web link, the web link is sent 100 to the user interface device from first server 77 or second server 80 while the user is browsing the Internet. The web link contains a specialized uniform resource identifier (URI) 105 or URL, termed a first URI. For the situation in which the user interface device is a set-top box, the web link may be sent 100 as a trigger during broadcast of television signals. The trigger is sent during a vertical blanking interval of the television broadcast, according to the Advanced Television Enhancement Forum Specification (ATVEF), incorporated herein by reference. The first URI 105 in this embodiment has a transfer protocol type or scheme 110 which is "wtv," which operates much like hypertext transfer protocol (HTTP) but is specific to the WebTV® network. A target 112 of the first URI 105 directed to a template file on the first server 77. The first URI 105 contains as a parameter a second URI 115 that identifies the previously downloaded video-TV file stored on the mass storage unit 27. The first URI 105 also contains as a parameter a third URI 118 that identifies the web page corresponding to the link, which as mentioned above is located on the second server.

When the user clicks 62 on the link corresponding to the video-TV file that was downloaded 60, the user interface device sends 108 the first URI 105 to the template file on the first server 77. The template file on the first server 77 receives the second URI 115 and the third URI 118 as input parameters, and is configured to output predetermined messages including those parameters. For example, the template file may create a message including the second URI 115 that is sent 120 from the first server to the user interface device, along with instructions to play the corresponding video-TV file that had been downloaded. In response to these instructions, the video-TV file is played 64.

In one embodiment, this message also includes the third URI 118, and instructions for the user interface device to prefetch the web page from the second server 80. In this case, the third URI 118 is sent 122 to the user interface device and the device attempts to prefetch the web page from the second server. The service center may have cached the web page, in which case the service center then sends 125 the cached web page back to the device in response to the request. If the service center does not have the web page locally stored or available in a shared cache, the first server requests the web page from the second server, and then sends the web page to the user interface device, acting as a proxy server for the device. The web page is then displayed 130. For the situation in which the web page is not prefetched, the web page may be requested by the device upon completion of playing the video-TV file, after which the web page is displayed.

In another embodiment, the template file creates two messages from the first URI 105, one of the messages containing the second URI 115 and the other message containing the third URI 118. In this embodiment, the second URI 115 is sent 120 from the first server 77 to the device, along with instructions to play the corresponding video-TV file that had been downloaded. Essentially simultaneously, the third URI 118 is sent 122 from the first server 77 to the second server 80, along with a request for the web page. The request for the web page may take the form of a request to send the web page to the device, in which case the request contains a URL for the device and may contain instructions to store the web page in device memory. The request for the web page may alternatively take the form of a request to send the web page to the first server 77, which in turn forwards the web page to the user interface device. In response to these signals, the device plays 64 the video file and the second server sends 125 the web page to the device. At the end of playing the video file, a signal may be sent from the storage unit to the controller of the device to display the web page. The web page that had been sent to and stored on the device is then displayed 130. Alternatively, the web page may be displayed 130 after a predetermined time corresponding to the length of the video file.

Since the third URI 118 is encapsulated within the first URI 105, the link that conventionally would lead to the web page is instead redirected to the service center. This redirection can be useful in a variety of ways. For example, if the web page corresponding to the link has changed, a message to that effect may be provided by the service center, or the service center can automatically redirect a message to the new web page. Also, a link may relate to a general category of product, such as may be displayed on an ISP home page, whereas a video specific to a certain brand or company may be downloaded and played upon clicking the generic link. Further, sending the second URL 115 first to the service center and then back to the device affords further control of the message by the service center. For example, if the video is outdated or the sponsor has not paid the service center for continued advertising, the video may not be played even though it is stored on the device.

In another embodiment that does not employ redirection, clicking on a link sends a signal directly to a video file stored on the device and sends a request directly to the web page corresponding to the link, which may bypass the service center.

Thus, a method, device and system for displaying a richly detailed video-TV file upon selecting a link to a web page relating to the file is provided in accordance with the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. In a computer network that comprises a service center, a plurality of user interface devices, and a plurality of servers, all logically interconnected to one another, wherein the plurality of servers provide content for download and display at the plurality of user interface devices, a method of displaying video data at a user interface device, wherein the video data is selected by the service center as potentially of interest to a user of the user interface device, without having to be specifically requested by the user interface device, and wherein the video data may include one or more advertisements, the method comprising the user interface device:

receiving video data that includes specific video data which is capable of being identified by one or more video data resource identifiers;

receiving a link that comprises (i) a content resource identifier that identifies content available at one or more of the plurality of servers, (ii) a service center template file address that identifies a service center template file for receiving one or more initial video data resource identifiers including video data resource identifiers that identify generic topics and for returning one or more subsequent video data resource identifiers including video data resource identifiers that identify specific video data, and (iii) a video data resource identifier;

displaying a representation of the link on the user interface device;

a user of the user interface device selecting the link;

displaying the specific video data based on the video data resource identifier received with the link, wherein at least a portion of the specific video data has been received and stored at the user interface device prior to being displayed; and receiving content identified by the content resource identifier either directly from one or more of the plurality of servers or indirectly through the service center.

2. A method as recited in claim 1, wherein the video data resource identifier received with the link is an initial video data resource identifier, the method further comprising:

passing the initial video data resource identifier and content resource identifier to the service center template file; and receiving a subsequent video data resource identifier back from the service center.

3. A method as recited in claim 2, wherein the subsequent video data resource identifier received back from the service center is the same as the initial video data resource identifier passed to the service center.

4. A method as recited in claim 2, wherein the initial video data resource identifier passed to the service center template file identifies a generic topic and the subsequent video data resource identifier received back from the service center identifies the specific video data.

5. A method as recited in claim 1, wherein the user interface device intercepts the user's selection of the link, the method further comprising:

separating the video data resource identifier and the content resource identifier from the link;

using the video data resource identifier to identify the specific video data received by the user interface device; and requesting content identified by the content resource identifier.

6. A method as recited in claim 1, wherein the user interface device receives the link as part of a broadcast trigger.

7. A method as recited in claim 1, wherein the video data is received when the user interface device is idle.

8. A method as recited in claim 1, further comprising acknowledging to the service center that the video data has been received.

9. A method as recited in claim 1, wherein the content identified by the content resource identifier is received while the specific video data is being displayed, the method further comprising displaying the received content.

10. A method as recited in claim 1, further comprising sending an indication to the service center of when to send video data.

11. In a computer network that comprises a service center, a plurality of user interface devices, and a plurality of servers, all logically interconnected to one another, wherein the plurality of servers provide content for download and display at the plurality of user interface devices, a computer program product for implementing a method of displaying video data at a user interface device, wherein the video data is selected by the service center as potentially of interest to a user of the user interface device, without having to be specifically requested by the user interface device, and wherein the video data may include one or more advertisements, the computer program product comprising:

a computer readable medium for carrying computer-executable instructions for implementing said method at a user interface device; and wherein said method is comprised of computer-executable instructions for:

receiving video data that includes specific video data which is capable of being identified by one or more video data resource identifiers;

receiving a link that comprises (i) a content resource identifier that identities content available at one or more of the plurality of servers, (ii) a service center template file address that identifies a service center template file for receiving one or more initial video data resource identifiers including video data resource identifiers that identify generic topics and for returning one or more subsequent video data resource identifiers including video data resource identifiers that identify specific video data, and (iii) a video data resource identifier;

displaying a representation of the link on the user interface device;

a user of the user interface device selecting the link;

displaying the specific video data based on the video data resource identifier received with the link, wherein at least a portion of the specific video data has been received and stored at the user interface device prior to being displayed; and receiving content identified by the content resource identifier either directly from one or more of the plurality of servers or indirectly through the service center.

12. A computer program product as recited in claim 11, wherein the video data resource identifier received with the link is an initial video data resource identifier, and wherein the method implemented by computer-executable instructions further comprises:

passing the initial video data resource identifier and content resource identifier to the service center template file; and receiving a subsequent video data resource identifier back from the service center.

13. A computer program product as recited in claim 12, wherein the subsequent video data resource identifier received back from the service center is the same as the initial video data resource identifier passed to the service center.

14. A computer program product as recited in claim 12, wherein the initial video data resource identifier passed to the service center template file identifies a generic topic and the subsequent video data resource identifier received back from the service center identifies the specific video data.

15. A computer program product as recited in claim 11, wherein the method implemented by computer-executable instructions further comprises:

intercepting a user's selection of the link;

separating the video data resource identifier and the content resource identifier from the link;

using the video data resource identifier to identify the specific video data received by the user interface device; and requesting content identified by the content resource identifier.

16. A computer program product as recited in claim 11, wherein the user interface device receives the link as part of a broadcast trigger.

17. A computer program product as recited in claim 11, wherein the video data is received when the user interface device is idle.

18. A computer program product as recited in claim 11, wherein the method implemented by computer-executable instructions further comprises acknowledging to the service center that the video data has been received.

19. A computer program product as recited in claim 11, wherein the content identified by the content resource identifier is received while the specific video data is being displayed, and wherein the method implemented by computer-executable instructions further comprises displaying the received content.

20. A computer program product as recited in claim 11, wherein the method implemented by computer-executable instructions further comprises sending an indication to the service center of when to send video data.

21. In a computer network that comprises a service center, a plurality of user interface devices, and a plurality of servers, all logically interconnected to one another, wherein the plurality of servers provide content for download and display at the plurality of user interface devices, a method of providing video data to a user interface device, wherein the video data is selected by the service center as potentially of interest to a user of the user interface device, without having to be specifically requested by the user interface device, and wherein the video data may include one or more advertisements, the method comprising:
   sending to the user interface device, video data that includes specific video data which is capable of being identified by one or more video data resource identifiers;
   sending to the user interface device, a link that comprises (i) a content resource identifier that identifies content available at one or more of the plurality of servers, (ii) a service center template file address that identifies a service center template file for receiving one or more initial video data resource identifiers including video data resource identifiers that identify generic topics and for returning one or more subsequent video data resource identifiers including video data resource identifiers that identify specific video data, and (iii) a video data resource identifier;
   sending the link to the user interface device;
   receiving a request directed to the service center template file, the request including the initial video data resource identifier; and
   sending a subsequent video data resource identifier back to the user interface device with an instruction to play the specific video data that is identified by the subsequent video data resource identifier.

22. A method as recited in claim 21, wherein the initial video data resource identifier and the subsequent video data resource identifier are the same.

23. A method as recited in claim 21, wherein the initial video data resource identifier identifies a generic topic and the subsequent video data resource identifier sent back to the user interface device identifies specific video data.

24. A method as recited in claim 21, wherein the initial video data resource identifier identifies initial specific video data, the method further comprising, redirecting the subsequent video data resource identifier, sent back to the user interface device, to identify the specific video data, wherein the specific video data is different from the initial specific video data identified by the initial video data resource identifier.

25. A method as recited in claim 21, wherein the request directed to the service center template file includes the content resource identifier, the method further comprising:
   requesting the content identified by the content resource identifier;
   receiving the content identified by the content resource identifier; and
   sending the received content to the user interface device.

26. A method as recited in claim 21, wherein the link is sent as part of a broadcast trigger.

27. A method as recited in claim 21, wherein the video data is sent when the user interface device is idle.

28. A method as recited in claim 21, further comprising receiving an acknowledgement from the user interface device that the video data has been received.

29. A method as recited in claim 21, further comprising receiving an indication from the user interface device to send video data.

30. In a computer network that comprises a service center, a plurality of user interface devices, and a plurality of servers, all logically interconnected to one another, wherein the plurality of servers provide content for download and display at the plurality of user interface devices, a computer program product for implementing a method of providing video data to a user interface device, wherein the video data is selected by the service center as potentially of interest to a user of the user interface device, without having to be specifically requested by the user interface device, and wherein the video data may include one or more advertisements, the computer program product comprising:
   a computer readable medium for carrying computer-executable instructions for implementing said method at the service center; and
   wherein said method is comprised of computer-executable instructions for:
      sending to the user interface device, video data that includes specific video data which is capable of being identified by one or more video data resource identifiers;
      sending to the user interface device, a link that comprises (i) a content resource identifier that identifies content available at one or more of the plurality of servers, (ii) a service center template file address that identifies a service center template file for receiving one or more initial video data resource identifiers including video data resource identifiers that identify generic topics and for returning one or more subsequent video data resource identifiers including video data resource identifiers that identify specific video data, and (iii) a video data resource identifier;
      sending the link to the user interface device;
      receiving a request directed to the service center template file, the request including the initial video data resource identifier; and
      sending a subsequent video data resource identifier back to the user interface device with an instruction to play the specific video data that is identified by the subsequent video data resource identifier.

31. A computer program product as recited in claim 30, wherein the initial video data resource identifier and the subsequent video data resource identifier are the same.

32. A computer program product as recited in claim 31, wherein the initial data resource identifier identifies a generic topic and the subsequent video data resource identifier sent back to the user interface device identifies the specific video data.

33. A computer program product as recited in claim 31, wherein the initial video data resource identifier identifies initial specific video data, the method implemented by computer-executable instructions further comprising, redirecting the subsequent video data resource identifier, sent back to the user interface device, to identify the specific video data, wherein the specific video data is different from the initial specific video data identified by the initial video data resource identifier.

34. A computer program product as recited in claim 30, wherein the requested directed to the service center template file includes the content resource identifier, and wherein the method implemented by computer-executable instructions further comprises:

requesting the content identified by the content resource identifier;

receiving the content identified by the content resource identifier; and sending the received content to the user interface device.

35. A computer program product as recited in claim 30, wherein the link is sent as part of a broadcast trigger.

36. A computer program product as recited in claim 30, wherein the video data is sent when the user interface device is idle.

37. A computer program product as recited in claim 30, wherein the method implemented by computer-executable instructions further comprises receiving an acknowledgement from the user interface device that the video data has been received.

38. A computer program product as recited in claim 30, wherein the method implemented by computer-executable instructions further comprises receiving an indication from the user interface device to send video data.

\* \* \* \* \*